INVENTOR
Fred D. Bearly
BY Arthur C. Brown
ATTORNEY

Patented Nov. 17, 1931

1,831,838

UNITED STATES PATENT OFFICE

FRED D. BEARLY, OF OKLAHOMA CITY, OKLAHOMA

DERRICK

Application filed February 13, 1930. Serial 428,113.

My invention relates to derricks and more particularly to a sectional derrick leg including coupling means of novel construction for joining the legs and leg sections of a derrick, the principal object of the invention being to provide for easy and quick connection and disconnection of the sections of individual legs and the assembly and disassembly of the legs in the erection or dismantling of a derrick.

In accomplishing this and other objects of the invention, I have provided improved details of structure, the preferred forms of which are illustrated in the accompanying drawings, wherein.

Figure 1:
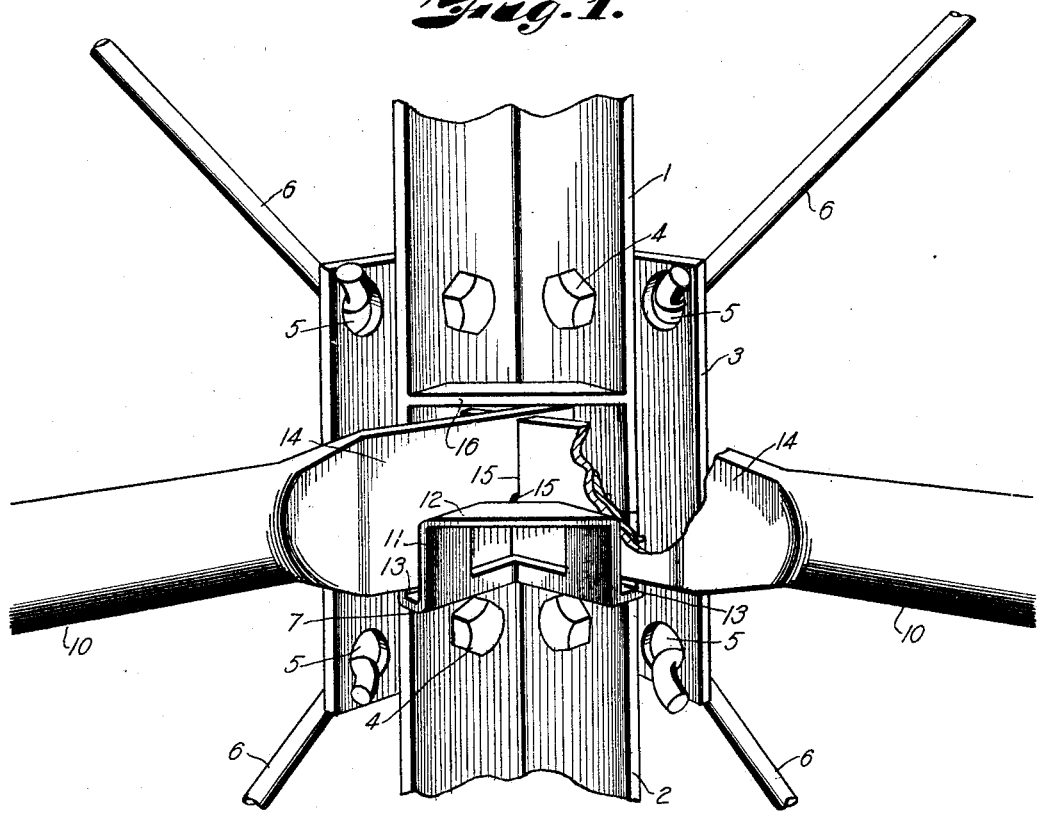
Fig. 1 is a fragmentary perspective view of a leg joint from within the derrick with parts broken away for better illustration of the coupling means for joining the leg sections.
Figure 2:
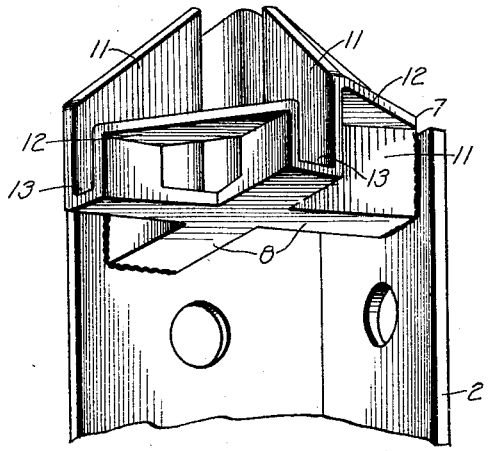
Fig. 2 is a detail perspective view of the upper end of a leg section showing the girth coupling member attached thereto.
Figure 3:
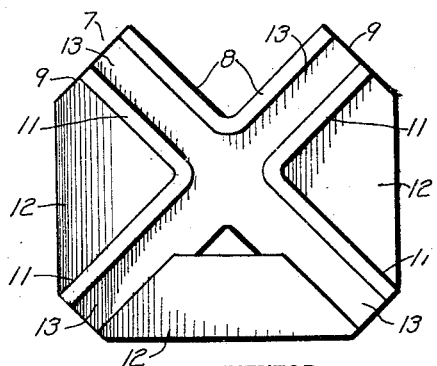
Fig. 3 is a plan view of the girth coupling.

Referring in detail to the drawings:

1 and 2 designate abutting sections of a derrick leg preferably constructed of angle iron and connected by an angle plate 3 secured to the outer side of the sections by means of bolts or like fastening means 4, the plate being provided at its corners with openings 5 for attachment of brace rods 6 leading to adjacent legs of the derrick (not shown).

Located at the upper end of each leg section is a coupling member 7 including cross arm portions 8 provided with squared ends 9 for attachment to the walls of the leg sections by welding or the like, and adapted for cooperation with girth members 10.

The arm portions are provided with upwardly protruding side plates 11 connected by web plates 12 and forming transversely extending channels 13 for receiving the flat head portions 14 of the girths.

The head portions 14 are provided with notches 15 for interlocking the girth members, and at the lower end of each leg section is an abutment plate 16 engaging the upper edges of the head portions 14 and retaining the members in the channels 13 in assembled relation with the leg sections.

In assembling a derrick leg constructed as illustrated and described, the lower section of the leg is mounted on a suitable base with the girth coupling 7 and angle plate 3 attached to its upper end. The flat head portions of the girths are applied in the coupling channels with their notched ends interlocked and the opposite ends of the girths attached to adjacent legs of the derrick structure. The next higher section is then placed in position and rests on the upper edge of the lower leg section and is secured to the plate 3, the abutment plate 16 resting on the upper edges of the girth heads 14. The next higher sections are then successively assembled on the leg as above described and the brace rods 6 connected with the angle plates and with adjacent legs of the derrick structure.

What I claim and desire to secure by Letters Patent is:

1. A derrick leg including angular abutting sections, a connector member joining said sections, a coupling member on each section, and an abutment plate on each section cooperating with the coupling of an adjoining section for securing girth members thereto.

2. A derrick leg including angular sections arranged end to end, a connector plate joining said sections, a coupling member at one end of the sections having intersecting channels, and an abutment plate at the opposite end of the sections cooperating with the channels of adjoining coupling members for securing girth members therein.

3. In combination with a derrick leg including angular abutting sections, a connector plate joining the sections, coupling members on the upper ends of the sections having transverse grooves, girth members engaging said grooves, and abutment plates at the lower ends of the sections retaining said girth members in said grooves.

4. In combination with a derrick leg including angular sections, a connector plate joining the sections end to end, a coupling member at one end of the sections having intersecting grooves, girth members having interlocking heads engaging said grooves, and a retainer plate at the lower end of the sections retaining said heads in said grooves.

5. In combination with a derrick leg including angular sections, a connector plate on the outer side of the leg joining the sections end to end, coupling members on the upper ends of the sections and on the inner side of the leg having transverse grooves, girth members having interlocking head portions engaging said grooves, and a retainer plate at the lower ends of the sections securing said head portions in said grooves.

6. In combination with a derrick leg including angular sections, a coupling plate on the outer side of the leg connecting said sections end to end, fittings on the upper ends of the sections and on the inner side of the leg having intersecting grooves, girth members having flat head portions engaging said grooves, said head portions having notches interlocking the girth members in said grooves, and retainer plates on the lower ends of the sections engaging said head portions for retaining the girth members in assembled relation with said fittings.

In testimony whereof I affix my signature.

FRED D. BEARLY.